US011299200B1

(12) United States Patent
Starik et al.

(10) Patent No.: US 11,299,200 B1
(45) Date of Patent: Apr. 12, 2022

(54) STEERING SYSTEMS FOR VEHICLES

(71) Applicant: REE AUTOMOTIVE LTD., Herzliya (IL)

(72) Inventors: Eran Starik, Tel Aviv (IL); Eylon Avigur, Ramat-Gan (IL)

(73) Assignee: REE Automotive Ltd., Herzliya (IL)

(*) Notice: Subject to any disclaimer, the term of this patent is extended or adjusted under 35 U.S.C. 154(b) by 0 days.

(21) Appl. No.: 17/501,673

(22) Filed: Oct. 14, 2021

Related U.S. Application Data

(60) Provisional application No. 63/108,915, filed on Nov. 3, 2020.

(51) Int. Cl.
*B62D 7/16* (2006.01)
*B60G 3/26* (2006.01)

(52) U.S. Cl.
CPC ............... *B62D 7/16* (2013.01); *B60G 3/26* (2013.01)

(58) Field of Classification Search
CPC .......... B62D 7/16; B62D 7/163; B62D 7/166; B60G 3/26; B60G 3/265
See application file for complete search history.

(56) References Cited

U.S. PATENT DOCUMENTS

| | | | | | |
|---|---|---|---|---|---|
| 2,019,982 | A | * | 11/1935 | Lautz ................. | B60G 3/26 267/230 |
| 2,038,597 | A | * | 4/1936 | Peo ................... | B60G 3/26 267/230 |
| 3,193,304 | A | * | 7/1965 | Behlke ............... | B60G 17/021 280/124.142 |
| 3,414,287 | A | * | 12/1968 | Weiertz .............. | B60G 3/26 280/5.521 |
| 4,377,298 | A | * | 3/1983 | Finn .................. | B60G 3/265 180/256 |
| 4,986,565 | A | * | 1/1991 | Hajto ................. | B60G 3/265 280/124.136 |

(Continued)

FOREIGN PATENT DOCUMENTS

| EP | 2336005 A1 | 6/2011 |
|---|---|---|
| EP | 3050779 A1 | 8/2016 |

OTHER PUBLICATIONS

International Search Report for PCT/IB2021/060140 dated Feb. 9, 2022.

(Continued)

*Primary Examiner* — Frank B Vanaman
(74) *Attorney, Agent, or Firm* — Momentum IP; Marc Van Dyke

(57) ABSTRACT

A steering system for a wheel of a vehicle includes a pivot member having multiple pivot-node locations. The pivot member is connectable at a first pivot-node location to a sub-frame of the wheel. A steering rod is actuatable to rotate the wheel about a steering axis and is mechanically coupled with the pivot member to be co-pivotable with the pivot member. A suspension-connector rod has a first end that is connected to the pivot member at a second pivot-node location, and has a second end that is connectable to a suspension arm linking the wheel of the vehicle to the sub-frame. When the steering system is installed in a vehicle, a lateral force acting upon the wheel is transmitted via the steering rod to the pivot member so as to rotate the pivot member, and the rotation is effective to transmit a substantially-vertical force vector to the sub-frame.

20 Claims, 8 Drawing Sheets

(56) References Cited

U.S. PATENT DOCUMENTS

| | | | | |
|---|---|---|---|---|
| 5,284,353 | A  * | 2/1994 | Shinji .................... | B60G 3/20 |
| | | | | 280/124.136 |
| 2009/0026725 | A1 * | 1/2009 | Haeusler ............. | B60G 21/007 |
| | | | | 280/124.135 |
| 2010/0013176 | A1 * | 1/2010 | Aramah .................. | B60G 3/26 |
| | | | | 280/5.521 |
| 2012/0061934 | A1 | 3/2012 | Scaduto | |
| 2015/0183461 | A1 * | 7/2015 | Chun .................... | B62D 7/228 |
| | | | | 180/445 |

OTHER PUBLICATIONS

Written Opinion for PCT/IB2021/060140 dated Feb. 9, 2022.
EP3050779A1 Machine Translation (from google patents)—published Aug. 3, 2016; Volkswagen AG.

* cited by examiner

VIEW A

VIEW B

TOP VIEW

TOP VIEW DETAIL

SIDE VIEW

TOP VIEW

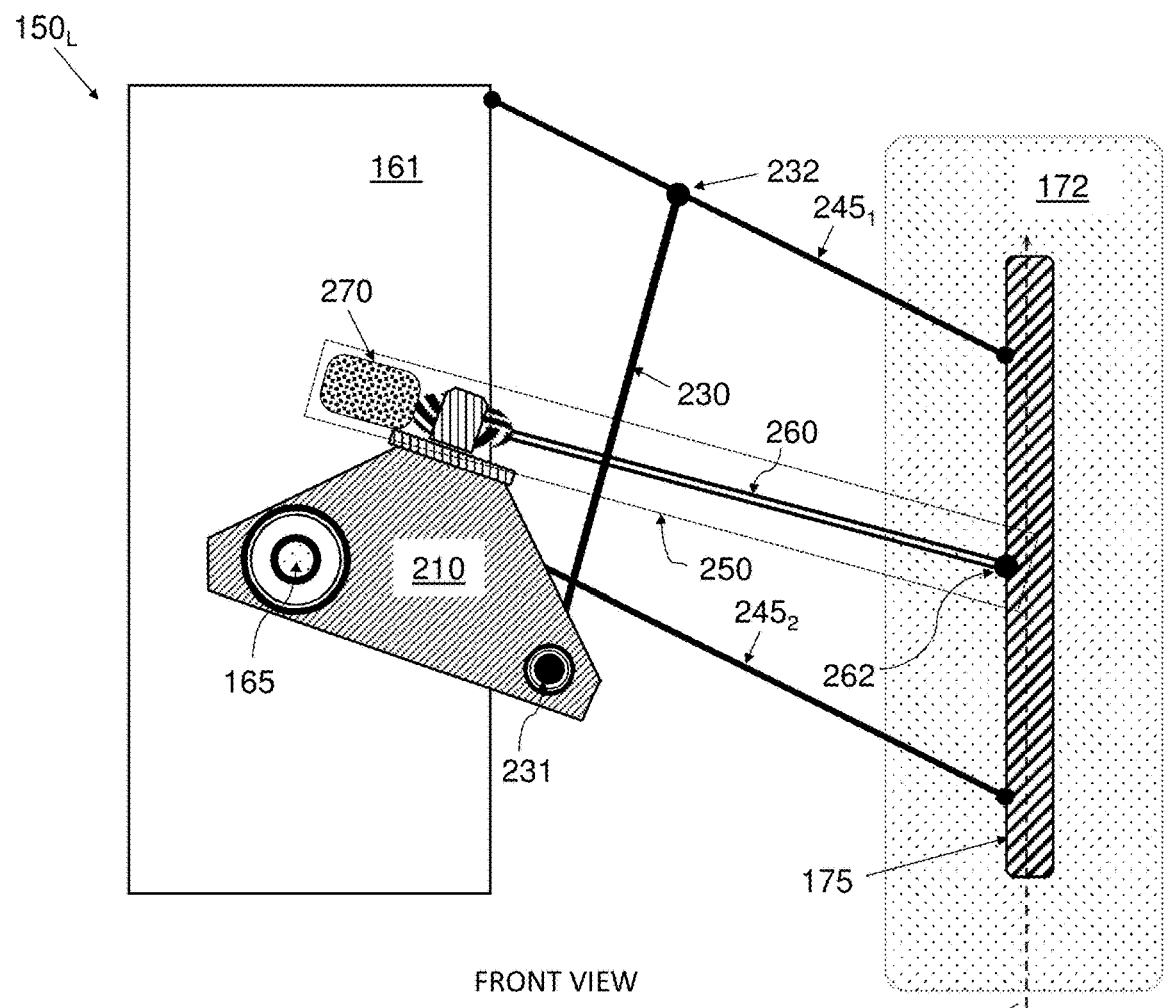
FRONT VIEW
FIG. 6
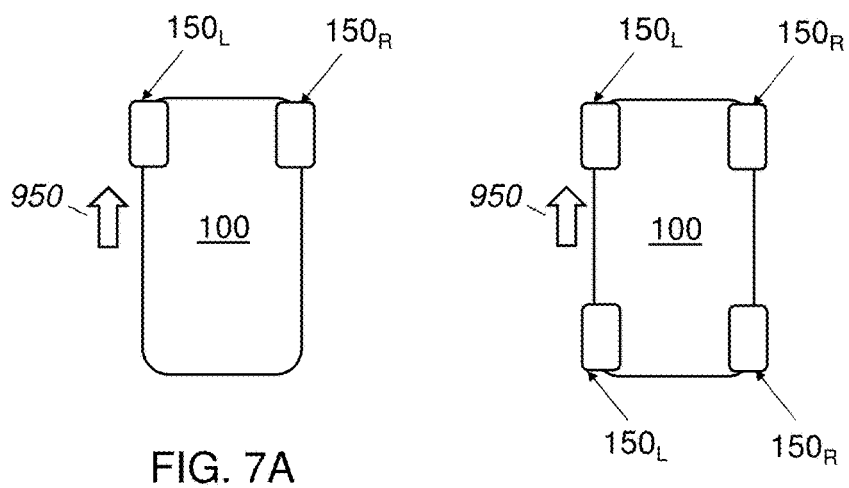
FIG. 7A
FIG. 7B

TOP VIEW

TOP VIEW *DETAIL A*

REAR VIEW

STEERING SYSTEMS FOR VEHICLES

CROSS-REFERENCE TO RELATED APPLICATIONS

This patent application claims the benefit of U.S. Provisional Patent Application No. 63/108,915, filed on Nov. 3, 2020, which is incorporated herein by reference in its entirety.

FIELD OF THE INVENTION

The present invention relates to steering systems for vehicles, and particularly to independent-wheel steering systems.

BACKGROUND

Vehicle suspension and steering systems have been developed and improved over the course of more than a century, resulting in sophisticated designs that, inter alia, serve to mitigate, reduce or even eliminate unwanted phenomena such as body roll and self-steering ('bump steering'). However, newly-conceived vehicle platforms designed for electric propulsion can include modular axle-less wheel assemblies featuring independent suspension and steering systems. These designs require new solutions for phenomena such as body roll and self-steering which do not depend upon mechanical interconnection between opposing wheels or wheel assemblies.

SUMMARY

According to embodiments, a steering system for a wheel of a vehicle comprises: (a) a pivot member having multiple pivot-node locations, the pivot member connectable at a first pivot-node location to a sub-frame of the wheel; (b) a steering rod, actuatable to rotate the wheel about a steering axis, the steering rod mechanically coupled with the pivot member to be co-pivotable therewith; and (c) a suspension-connector rod connected at a first end thereof to the pivot member at a second pivot-node location, the suspension-connector rod connectable at a second end thereof to a suspension arm linking the wheel of the vehicle to the sub-frame, wherein a lateral force acting upon the wheel is transmitted via the steering rod to the pivot member so as to rotate the pivot member, the rotation being effective to transmit a substantially-vertical force vector to the sub-frame.

In some embodiments, the lateral force can be an inwardly-directed load on the steering rod, and the substantially-vertical force vector can be a downward force vector. In some embodiments, the lateral force can be an outwardly-directed load on the steering rod, and the substantially-vertical force vector can be an upward force vector.

In some embodiments, it can be that when (i) the steering system is installed in the vehicle, (ii) the vehicle is in motion in a curve and (iii) the wheel is a wheel facing inside the curve, the substantially-vertical force vector is a downward force vector. In some embodiments, it can be that when (i) the steering system is installed in the vehicle, (ii) the vehicle is in motion in a curve and (iii) the wheel is a wheel facing outside the curve, the substantially-vertical force vector is an upward force vector.

In some embodiments, the rotation can additionally be effective to transmit an at-least-partly vertical force vector to the suspension-connector rod, wherein a vertical component of the at-least-partly vertical force vector is in a direction opposite to that of a vertical component of the substantially-vertical force vector. In some such embodiments, the at least-partly-vertical force vector and the substantially-vertical force vector can combine to mitigate body roll of the vehicle.

In some embodiments, the steering system can comprise an actuator connected to the steering rod and configured to cause the steering rod to move inwardly and outwardly, and an actuator-coupling connecting the actuator and the pivot member. In some such embodiments, the actuator-coupling can include a bearing arrangement to allow the steering system to swivel relative to the pivot member such that a distal end of the steering rod can move to describe a generalized cone.

In some embodiments, the wheel of the vehicle can be one of two opposing, independently-suspended wheels.

According to embodiments, a wheel assembly for an axle-less, independently-suspended wheel comprises: (a) a sub-frame configured to be mounted to a reference frame of a vehicle; (b) a wheel interface; and (c) a steering system comprising: (i) a pivot member having multiple pivot-node locations and connected at a first pivot-node location to the sub-frame; (ii) a suspension-connector rod connected at a first end thereof to the pivot member at a second pivot-node location, and at a second end thereof to a suspension arm linking the wheel interface to the sub-frame, and (iii) a steering assembly comprising (1) a steering rod connected distally to the wheel interface and proximally actuatable to rotate the wheel about a steering axis, and (2) an actuator for causing the steering rod to move inwardly and outwardly, the actuator mechanically coupled to the pivot member such that the steering assembly is co-pivotable with the pivot member about the first and second pivot-node locations. The pivot member is arranged to transfer a lateral force from a roadway surface to multiple at-least-partly vertical force vectors that combine to mitigate body roll of the vehicle.

In some embodiments, the mechanical coupling of the actuator can include a bearing arrangement to allow the steering assembly to swivel relative to the pivot member such that a distal end of the steering rod can move to describe a generalized cone.

In some embodiments, the wheel assembly can additionally comprise a drivetrain assembly comprising a drivetrain motor mounted to the sub-frame, and a rotatable drivetrain shaft extending from the drivetrain motor towards the wheel interface to connect thereto.

In some embodiments, a vehicle can comprise a pair of opposing wheel assemblies, wherein each wheel assembly of the pair of opposing wheel assemblies is in accordance with the embodiments of the wheel assembly disclosed hereinabove. The vehicle additionally comprises a corresponding pair of opposing wheels, and the reference frame. In some embodiments of the vehicle, for each one of the two wheel assemblies, a lateral force acting upon the wheel can be transmitted via the steering rod to the pivot member so as to rotate the pivot member, the rotation being effective to transmit a substantially-vertical force vector to the reference frame. In some embodiments of the vehicle, for the two opposing wheel assemblies, the respective substantially-vertical force vectors transmitted to the reference frame can be in opposing directions. In some embodiments of the vehicle, the rotation can additionally be effective to transmit an at-least-partly vertical force vector to the respective suspension-connector rod, wherein a vertical component of the respective at-least-partly vertical force vector is in a direction opposite to that of a vertical component of the respective substantially-vertical force vector. In some such embodiments, the respective at least-partly-vertical force vectors and the respective substantially-vertical force vectors can combine to mitigate body roll of the vehicle.

According to embodiments, a passive anti-roll system for an axle-less vehicle comprises, for each wheel of a pair of opposing independently-suspended wheels, a pivot member arranged to transfer a lateral force from a roadway surface to multiple at-least-partly vertical force vectors that combine to mitigate body roll of the vehicle. In some embodiments, an axle-less vehicle can comprise the passive anti-roll system. In such embodiments, each wheel of the pair of opposing independently-suspended wheels can comprise a steering assembly comprising (i) a steering rod connected distally to the wheel interface and proximally actuatable to rotate the wheel about a steering axis, and (ii) an actuator for causing the steering rod to move inwardly and outwardly. The actuator can be mechanically coupled to the pivot member such that the steering assembly is co-pivotable with the pivot member about first and second pivot-node locations of the pivot member.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 6 is a schematic front-view drawing of a left wheel assembly according to embodiments of the present invention.

FIGS. 7A-B are schematic plan-view drawings of a vehicle comprising wheel assemblies according to embodiments of the present invention.

DETAILED DESCRIPTION OF THE ILLUSTRATED EMBODIMENTS

Figure 1A:
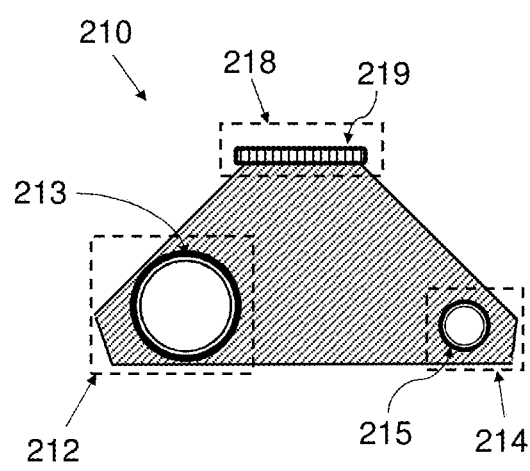
FIGS. 1A, 1B, 1C, and 1D are schematic elevation-view drawings of pivot members according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., $10_1$ or $10_A$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, i.e., to the species in general.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Embodiments of the present invention can relate to vehicles, wheel assemblies for vehicles and steering systems for vehicles. When used in this specification and in the claims appended hereto, the word 'vehicle' is to be understood as referring to a motorized vehicle having at least 3 wheels. Non-limiting examples of a vehicle, according to this definition, are a vehicle with motive power provided by an onboard engine, and an 'electric vehicle' powered, when in motion, by one or more electric motors and a battery or other energy storage device) onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which wheel assemblies can be mounted) and at least 3 wheels. A 'vehicle platform' need not necessarily comprise, at the time of providing the vehicle platform, all of the accoutrements required for transport of passengers and/or cargo such as vehicle-body components or interior furnishings.

The term 'wheel assemblies' is used to describe assemblies of steering components and/or drivetrain components and/or suspension components, where such an assembly is a unit that can be mounted to a 'reference frame' of a vehicle, e.g., a chassis or similar vehicle frame, although the mounting need not necessarily be done 'as a unit'. A wheel assembly may include a 'sub-frame' to which some or all of the assembly components are mounted or otherwise attached such that the sub-frame mediates between the reference frame and the various assembly components. The term 'sub-frame' can be understood to mean any rigid frame or one or more structural elements in fixed combination. The 'sub' prefix is intended to distinguish the sub-frame from a main frame or reference frame of the vehicle. A wheel assembly or may not include an electric motor and/or the wheel itself.

A 'steering system', as the term is used herein, should be understood to mean any combination of components used in steering the vehicle, and specifically the components included in a wheel assembly. 'Steering the vehicle' can include translating mechanical and/or electronic signals to the rotation of a wheel about a steering axis. Wheel assemblies can include steering systems, and vehicles can include wheel assemblies that include steering systems. In other words, steering-related components that are not included in a wheel assembly, such as the steering wheel of the vehicle, are not included in this definition of a 'steering system' unless explicitly mentioned.

In embodiments, a steering system for a wheel of a vehicle can comprise a pivot member having multiple pivot-node locations and connectable at a first pivot-node location to a sub-frame of the wheel (and/or wheel assembly), and/or a steering rod, actuatable to rotate the wheel about a steering axis and mechanically coupled with the pivot member to be co-pivotable therewith; and/or a suspension-connector rod connected at a first end thereof to the pivot member at a second pivot-node location and connectable at a second end thereof to a suspension arm linking the wheel of the vehicle to the sub-frame, wherein a lateral force acting upon the wheel is transmitted via the steering rod to the pivot member so as to rotate the pivot member, the rotation being effective to transmit a substantially-vertical force vector to the sub-frame. In embodiments, a steering system for a wheel of a vehicle can comprise a pivot member having multiple pivot-node locations, the pivot member being connected (when the steering system is installed in the vehicle) at a first pivot-node location to a sub-frame of the wheel (and/or wheel assembly); and/or a steering rod, actuatable to rotate the wheel about a steering axis and mechanically coupled with the pivot member to be co-pivotable therewith; and/or a suspension-connector rod connected at a first end thereof to the pivot member at a second pivot-node location and connected (when the steering system is installed in the vehicle) at a second end thereof to a suspension arm linking the wheel of the vehicle to the sub-frame, wherein a lateral force acting upon the wheel (when the steering system is installed in the vehicle and/or when the vehicle is moving in a curve) is transmitted via the steering rod to the pivot member so as to rotate the pivot member, the rotation being effective to transmit a substantially-vertical force vector to the sub-frame. The wheel of the vehicle can be one of two opposing independently-suspended wheels and/or one of two opposing, axle-less independently-suspended wheels.

In embodiments, wheel assemblies and steering systems can be provided in opposing pairs, or installed on a vehicle in opposing pairs. Thus, any illustration of a wheel assembly or steering system in the accompanying figures may be appropriate for installation on one side or the other of a vehicle, and a skilled artisan will understand that a 'mirror-image' implementation may be appropriate for the opposing side of the vehicle.

In embodiments, wheel assemblies and steering systems can be employed with wheels which are axle-less and/or independently-suspended. In some vehicles, it can be that a first opposing pair of wheels is axle-less and independently-suspended while a second opposing pair of wheels uses 'conventional' or 'prior-art' arrangements of an axle and suspension system. In other vehicles, it can be that all opposing pairs of wheels are axle-less and independently-suspended. Some vehicles may implement the disclosed embodiments with respect to wheel assemblies and steering systems only at a first pair of wheels as disclosed herein, and some other vehicles may implement the embodiments at all wheels.

A 'pivot member' for a steering system of a vehicle, as the term is used herein and in the appended claims, means a member (or assembly of members) which enables one or more connections between components of a wheel assembly. Connections can include pivotable connections and non-pivotable connections. Non-pivotable connections can include swivelable connections as described hereinbelow with respect to FIGS. 5A-B, wherein a connection allows a connected component to swivel within a predetermined range of movement.

Referring now to the figures, and in particular FIGS. 1A-1D, various designs for a pivot member 210 are illustrated schematically. In the non-limiting examples of FIGS. 1A-1D, each one of the pivot members 210 is designed for 3 connections, at least two of which are termed pivotable connections herein. However, a pivot member according to embodiments can have fewer connections—for example: two—or more connections—for example: four or more.

In the non-limiting example of FIG. 1A, the pivot member 210 can be seen to be roughly triangular in shape, and to include respective first and second pivot-node locations 212, 214. A first pivot-node interface 213, at which a first pivotable connection to the pivot member 210 can be made, is at the first pivot-node location 212. Similarly, a second pivot-node interface 215, at which a second pivotable connection to the pivot member 210 can be made, is at the second pivot-node location 214. The first pivot-node interface 213 in FIG. 1A is shown as being considerably larger than the second pivot-node interface 215, but this is a non-limiting design choice, and in FIGS. 1B and 1C the two pivot-node interfaces 213, 215 are illustrated with roughly equal size. In some designs, the relative size of the interfaces can be based on physical and mechanical requirements of the individual pivotable connection. In preferred embodiments, the first and second pivot-node interfaces 213, 215 are configured to connect pivotably (1) to a corresponding interface of a sub-frame of a vehicle and (2) to a force-transfer member in communication with a suspension system of the vehicle. Conceptually, it doesn't matter which pivot-node interface is employed for which connection, but for purposes of consistency and clarity this disclosure will adopt the convention of associating the first pivot-node interface 213 with the vehicle sub-frame, and the second pivot-node interface 215 with the suspension connection. A steering assembly interface 219 located at a steering assembly coupling location 218 of the pivot member is provided, to connect with a steering assembly, as will be described in greater detail hereinbelow. The steering assembly interface 219 can, in some embodiments, be arranged so as to allow the steering assembly to pivot relative to the pivot member 210.

Figure 1B:
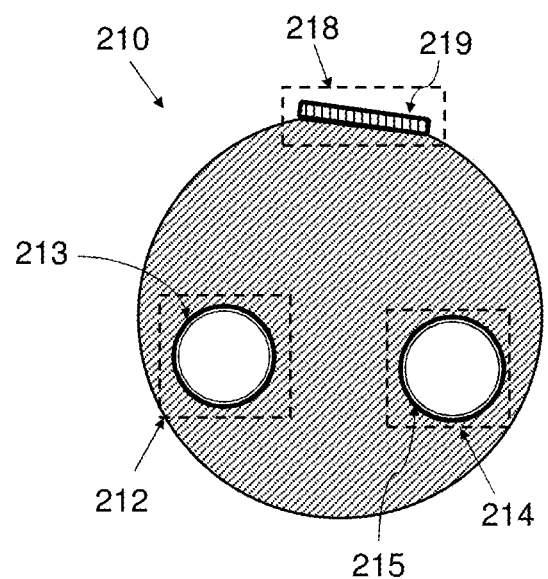

The shape of the pivot member is unimportant to the practice of the invention as long as the respective functionalities of multiple pivot-node interfaces and of the steering assembly interface 219 are present in the design. FIG. 1B shows an example of a pivot member 210 with a roughly circular shape, in contrast to the triangular shape of FIG. 1A.

Figure 1C:
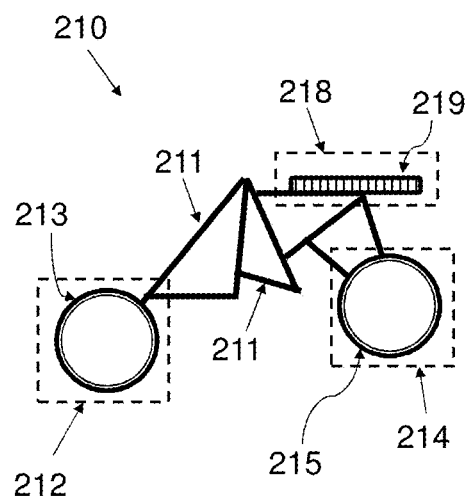

FIG. 1C shows an example of a pivot member 210 that comprises a plurality of interconnected 'pivot-member members' 211.

Figure 1D:
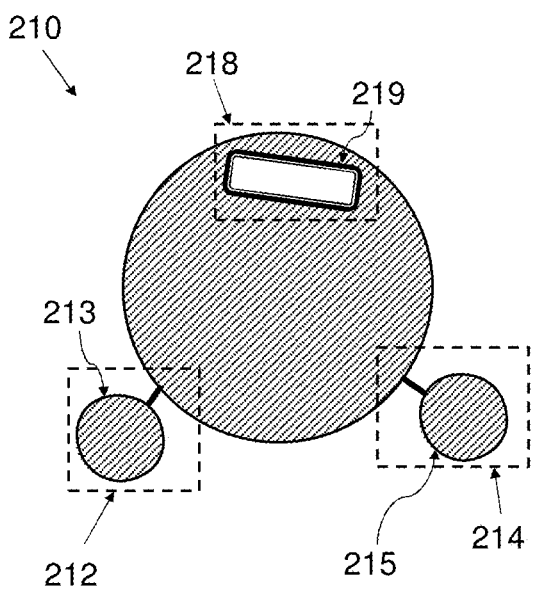
Figure 2A:
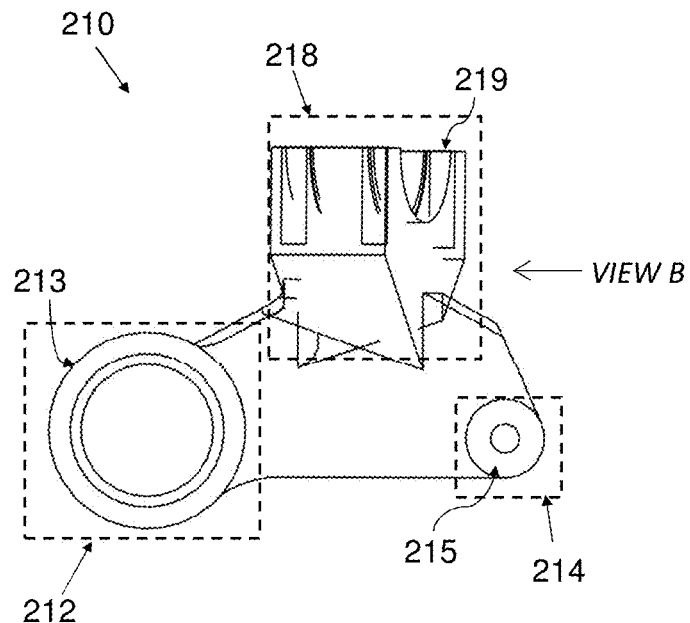
FIGS. 2A-B are schematic elevation-view drawings of a pivot member according to embodiments of the present invention.
Figure 2B:
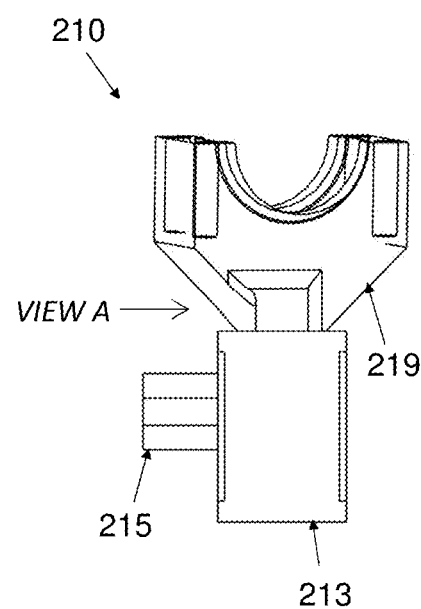
Figure 2C:
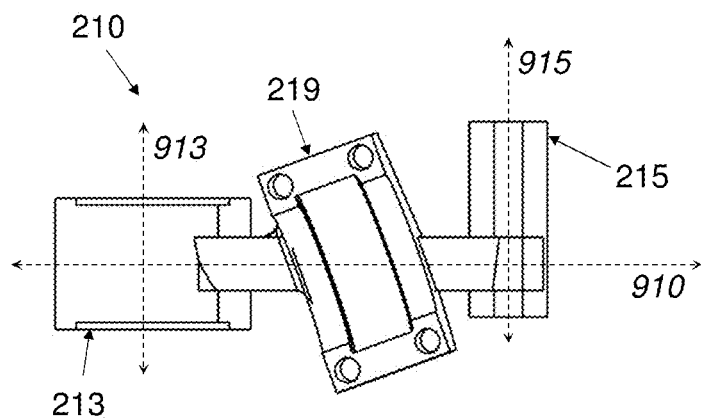
FIGS. 2C-D are respectively schematic top and top-detail views of the pivot member of FIGS. 2A-B, according to embodiments of the present invention.
Figure 2D:
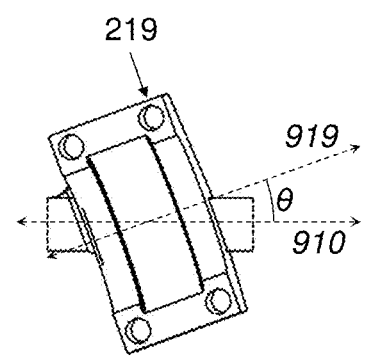

FIG. 1D illustrates a pivot member 210 with interfaces designed differently than those interfaces shown in FIGS. 1A-C. For example, the first and second pivot-node interfaces 213, 215 both include 'male' elements designed to be pivotably connected within corresponding 'female' elements of the sub-frame and suspension connection, whereas in contradistinction the interfaces 213, 215 of FIGS. 1A-C each includes a 'female' element designed to have a 'male' element of a sub-frame or suspension connection be pivotably connected therewithin. In addition, the steering assembly interface 219 of FIG. 1D is designed for a connection housed within the body of the pivot member 210, in contrast to the steering assembly interfaces of FIGS. 1A-C which were all designed for external connections.

Regardless of which pivot member designs and interface types are shown throughout the figures, any suitable pivot member design and interface type with similar functionalities are within the scope of the present invention.

Referring now to FIGS. 2A-D, several views are shown of an exemplary pivot member 210 according to embodiments. All exemplary illustrations attached hereto are for illustration of certain features and are non-limiting with respect to alternative designs and features. As can be seen in the 'A-side' view of FIG. 2A, the first pivot-node interface 213 is designed for a considerably larger corresponding 'male' element, of the sub-frame, than is the second pivot-node interface 215, which is to be connected pivotably with a suspension connection. Steering-assembly interface 219 is designed as a cradle or half-clamp for receiving a steering assembly component such as an actuator. As can be seen in the 'B-side-view of FIG. 2B and in the top view of FIG. 2C, the second pivot-node interface 215 is 'deeper' than the first pivot-node interface 213 so as to displace the suspension connection 'sideways' from the main body of the pivot member 210. The top view of FIG. 2C reveals that respective central axes (indicated by arrows 913, 915) of the first and second pivot-node interfaces 213, 215 are substantially parallel to each other. 'Substantially parallel' as used herein means within ±1° of parallel, or within ±2°, or within ±3°, or within ±4°, or within ±5°, or within ±6°, or within ±7°, or within ±8°, or within ±9°, or within ±10°, or within ±11°, or within ±12°, or within ±13°, or within ±14°, or within ±15°. The steering-assembly interface 219 can be arranged so that its central axis, indicated in FIG. 2D by arrow 919, is at angle θ from a central axis of the main body of the pivot member 210, indicated in FIGS. 2C-D by arrow 910. The steering assembly coupling angle θ can be selected in accordance with the placement of the pivot member and steering assembly within a wheel assembly, and the placement of the distal end of the steering assembly where it meets a wheel interface components (such as, for example, a steering knuckle or equivalent). In examples, the steering assembly coupling angle θ can be between 5° and 30°, or between 100 and 30°, or between 150 and 30°, or between 5° and 25°, or between 100 and 25°, or between 150 and 25°. The steering-assembly interface 219 can be arranged at any suitable angle to the main body of the pivot member 210, in accordance with the design of the wheel assembly and its other components.

A pivot member may comprise a single element or may be assembled from a plurality of members. Manufacturing of a pivot member can be accomplished using one or more of the known manufacturing techniques including, and not exhaustively: casting, sintering, machining, electro-erosion (electrical discharge machining), and 3D-printing.

Figure 3:
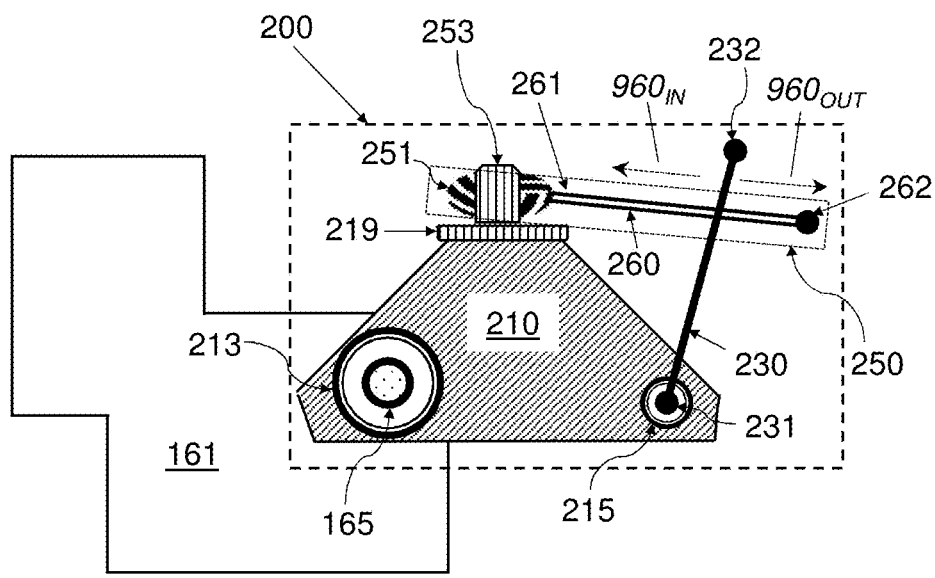
FIG. 3 is a schematic diagram of a steering system for a vehicle, shown with one or more additional components of the steering system, according to embodiments of the present invention.

FIG. 3 is a schematic drawing of a steering system 200 according to embodiments, comprising the exemplary pivot member 210. of FIG. 1A. The pivot member is pivotably connected to a sub-frame 161 at the first pivot-node location 212, and specifically at the first pivot-node interface 213. The sub-frame 161 is a rigid frame which, when a wheel assembly is installed on a vehicle, is fixedly mounted to a reference frame, e.g., a chassis. Thus, while the pivot member 210 and sub-frame 161 can be pivotably connected such that either of the two components can pivot or rotate around the pivot-node connection relative to the other, in actual practice only the pivot member 210 can be considered as pivoting with respect to the sub-frame 161 (which from the perspective of the other components of a wheel assembly is not moveable). A suspension-connector rod 230 has a proximal end 231 pivotably connected to the pivot member 210 at the second pivot-node location 212, and specifically at the second pivot-node interface 214. The distal end 232 of the suspension-connector rod 230 is configured for connecting (preferably: pivotably connecting) to a suspension arm (not shown in FIG. 3). In embodiments, the distal end 232 of the suspension-connector rod 230 is connected to the suspension arm when installed in a wheel assembly. A steering assembly 250 comprising an actuator 251 and a steering rod 260 is coupled to the steering-assembly interface 219 of the pivot member 210. The actuator 251 comprises a linear actuator, effective to translate rotary motion to linear motion of the steering rod 260. Non-limiting examples of suitable actuators include, and not exhaustively: mechanical screw actuators including ball screws, and hydraulic or pneumatic cylinder actuators. The steering rod 260, configured for connecting at its distal end 262 to a wheel or wheel interface (e.g. upright, wheel hub assembly, etc.) is proximally actuatable by the actuator 251 so as to (a) move distally, or outwardly, in the direction indicated in FIG. 3 by arrow $960_{OUT}$, and to (b) move proximally, or inwardly, in the opposite direction as indicated in FIG. 3 as arrow $960_{IN}$. In embodiments, the steering rod 260 is connected to the wheel interface when installed in a wheel assembly. In embodiments, a proximal portion 261 of the steering rod 260 is in linearly-movable contact with the actuator 251, which can be coupled or secured to the steering-assembly interface 219 of the pivot member 210 by an actuator-securing member 253 optionally using securing elements (not shown) such as screws, nuts, bolts, etc. which may be used to join the actuator-securing member 253 to the steering-assembly interface 219. In other embodiments (not illustrated), the actuator-securing member 253 can be pivotably mounted to the pivot member 210. For example, the actuator 251 and actuator-securing member 253 can be coupled to one of the two major surfaces of the pivot member 210 at the steering assembly coupling location 218 of the pivot member so that the steering assembly can pivot either through a plane that is either parallel to the pivot member 210 or through an arc in which the steering assembly does not intersect the pivot member 210. Additional features of the steering system 200 are now described with reference to FIGS. 4A, 4B, 5A and 5B.

Figure 4A:
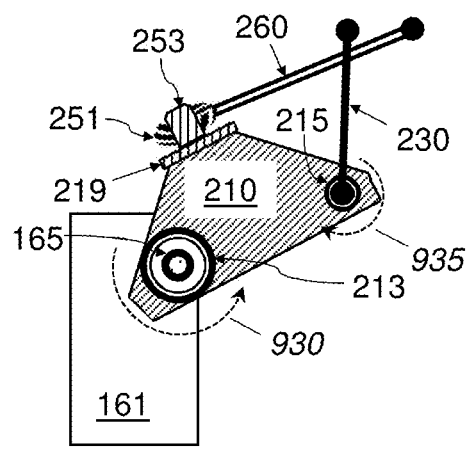
FIGS. 4A-B are schematic diagrams of the steering system of FIG. 3, illustrating the pivoting of certain steering-system components, according to embodiments of the present invention.
Figure 4B:
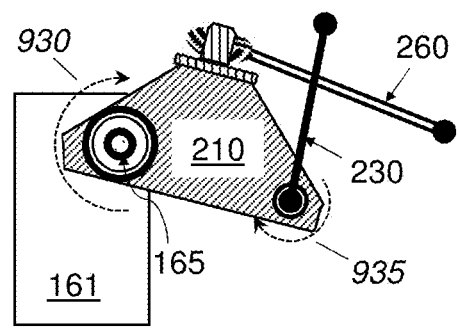

As shown in FIGS. 4A-B, when the steering system 200 is installed in a wheel assembly, the first pivot-node interface 213 of the pivot member 210 is arranged to allow the pivot member 210 to pivot about a corresponding pivot-connection element 165 of the sub-frame 161. In some implementations, the pivot member 210 is arranged to pivot freely, and in other implementations the pivoting can be dampened or otherwise limited. Rotation of the pivot member 210 relative to the pivot-connection element 165 is indicated by arrow 930 in both FIGS. 4A and 4B, which show respectively, counter-clockwise and clockwise pivoting. Note: all references to 'clockwise' and 'counter-clockwise' directions in this disclosure relate only to rotational directions shown in specific figures are mentioned for purposes of clarity in describing a figure. Obviously, these terms lack substance in an absolute sense; for example, a 'clockwise' rotation, when viewed from an opposite perspective, will be seen as a counter-clockwise rotation, and vice versa. In some embodiments, the first pivot-node interface 213 and/or or the pivot-connection element 165 can be shaped to constrain the range of rotation. In addition, the engagement of the first pivot-node interface 213 pivot-connection element 165 can be such that the rotation is limited to planar rotation, although in some embodiments the rotation can be spherical or hemi-spherical.

The steering assembly 250 (comprising the actuator 251 and the steering rod 260) pivots together with the pivot-member 210, due, at least in part, to the presence of the actuator-securing member 253. In other words, both the steering rod 260 and the actuator 251 are arranged to co-pivot, or to be co-pivotable, with the pivot member 210 around the pivotable connection of the first pivot-node interface 213 of the pivot member 210 to the pivot-connection element 165 of the sub-frame 161. For clarity, the term 'co-pivot' (or co-pivotable, etc.) is used herein exclusively to mean that the co-pivoting elements pivot together as a connected 'unit' as illustrated in the examples of FIGS. 4A-B, and should not be understand to mean that the co-pivoting elements can pivot synchronously but separately (i.e., uncoupled from each other). The actuator 251 is co-pivotable with the pivot member 210 because the actuator 251 is coupled to the steering-assembly interface 219, and the steering rod 260 is co-pivotable with the pivot member 210 because the steering rod 260 is connected to the actuator 251 in a fixed angle of orientation relative to the actuator 251.

The pivoting direction of the suspension-connector rod around the second pivot-node interface 215 of the pivot member 210 is indicated by the arrow 935. It should be noted that the arrow 935 as drawn indicates rotation of the suspension-connector arm 230 relative to the pivot member 210, in contrast to the arrow 930 which indicates rotation of the pivot member 210 relative to the pivot-connection element 165 of the sub-frame 161. This convention is used in the figures because in actual implementation the pivot member 210 is not completely 'free' to rotate about the proximal end 231 of the suspension-connector rod 230 because the pivot member 210 is 'anchored', if pivotably, to the sub-frame 161. Furthermore, rotation of the pivot member 210 around the pivot-connection element 165 can also be constrained or dampened by the pivotable 'anchoring' of the distal end 232 of the suspension-connector rod 230 where it connects, when installed in a wheel assembly, with a suspension arm. The latter connection also tends to constrain or dampen the rotational movement of the suspension-connector rod 230 around the second pivot-node interface 215 of the pivot member 210 because the suspension arm (not shown in FIGS. 4A-B) can be arranged to provide a resistive force (related to gravity and the mass of the vehicle) to movement of the distal end 232 of the suspension-connector rod 230. In the non-limiting examples of FIGS. 4A and 4B, the direction of rotation 935 of the suspension-connector rod 230 relative to the second pivot-node interface 215 of the pivot member 210 is shown as being opposite to the rotation direction 930 of the pivot member 210 around the pivot-connection element 165. The direction of rotation 935 of the suspension-connector rod 230 relative to the second pivot-node interface 215 (in actual operation) can be influenced by the angle at which the suspension-connector rod 230 meets the suspension arm, and/or by the resistance of the suspension arm to being moved by the rotation; in some embodiments, the direction of rotation 935 can be the opposite of that shown in FIGS. 4A-4B.

Figure 5A:
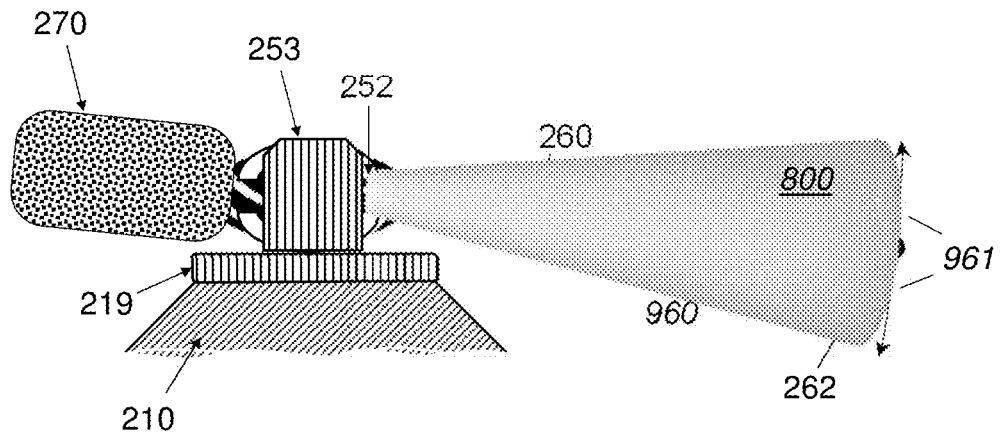
FIGS. 5A-B are respectively side and top view schematic diagrams of a swivelable steering assembly according to embodiments of the present invention.
Figure 5B:
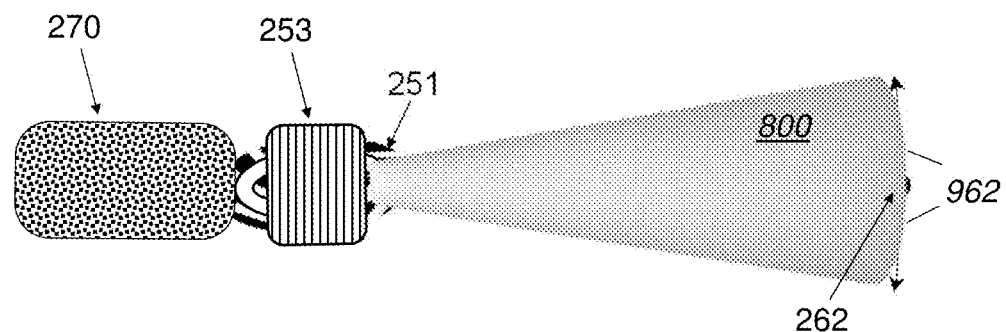

FIGS. 5A-B are, respectively, side and top views of a steering assembly 250 mechanically coupled to the steering-assembly interface 219 of the pivot member 210 using the actuator-securing member 253. In the non limiting example of FIGS. 5A-B, the steering assembly 250 additionally comprises a power steering motor 270 which generates the rotary movement translated by the actuator 251 to linear movement of the steering rod 260. The coupling of the actuator 251 includes the use of a bearing arrangement 252. The bearing arrangement can comprise any type of bearing, including (but not exhaustively) ball bearings, roller bearings, fluid bearings, flexure bearings, ball joints, and spherical joints. The purpose of the bearing arrangement 252 is to make the steering assembly 260 (comprising at least the actuator 251 and steering rod 260, and optionally a steering motor 270) swivelable relative to the steering-assembly interface 219 of the pivot member 210. Any mechanical arrangement that couples the actuator 251 to the steering-assembly interface 219 of the pivot member 210 while allowing the steering assembly 250 to be swivelable relative to the pivot member 210 would fall under the meaning of the term 'bearing arrangement' as used herein. The term 'swivelable', in contrast to 'pivotable' which herein indicates rotation around a single axis, is used to mean that the bearing arrangement 252 gives the steering rod 260 at least one additional degree of freedom, in addition to the inward/outward movement produced by the actuator 251 (indicated by arrows 960 in FIGS. 3 and 5A), and in addition to optional rotation about its own axis (not shown). It should be noted that the steering rod 260 swivels together with the other components of the steering assembly 250, i.e., the actuator 251 and, optionally the steering motor 270.

The side-view diagram of FIG. 5A shows a first additional degree of freedom, with the distal end 262 of the steering rod 260 being able to move up and down as indicated by arrows 961. The top-view diagram of FIG. 5B shows a second additional degree of freedom with the distal end 262 of the steering rod 260 able to move left and right (side-to-side) as indicated by arrows 962. In combination, the inward/outward movement, the up/down movement and left/right movement allow the distal end 262 of the steering rod 260 to move through a volume of space describing a generalized cone 800 as indicated in FIGS. 5A-B. The term 'generalized cone' as used in this disclosure and in the claims appended thereto means the surface created by a set of lines passing through the actuator (as the vertex of the generalized cone) and the set of points in space reachable by the distal end 262 of the steering rod 260 according to its limits of movement. In practice, the limits of movement as indicated by the cone 800, if any, can be based on the design of the bearing arrangement 252, the design of the steering-assembly interface 219 of the pivot member 210 and of the actuator-securing member 253, and/or the connection of the distal end 262 of the steering rod 260 to the wheel interface and the range of movement of such a connection.

We now refer to FIG. 6, which shows a schematic front-view drawing of a exemplary left-side wheel assembly $150_L$ according to embodiments. Generally speaking, the arrangement of some of the components of a wheel assembly 150 requires that a wheel assembly be assembled either as a left-side wheel assembly $150_L$ or as a right-side wheel assembly $150_R$. For example, a connection of a distal end 262 of a steering rod 260 to a wheel interface is generally forward of the steering axis of a wheel, in order to provide, inter alia, positive caster. The wheel assembly 150 includes a pivot member 210, a steering assembly 250 and a suspension-connector rod 230, pivotably connected at its proximal end 231 to the pivot member 210 and at its distal end 232 to a suspension am 245. The steering assembly 250 comprises a steering rod 260, a actuator 251 (as shown in FIGS. 3, 4A ad 5B) and, optionally, a steering motor 270. The wheel assembly 150 also comprises a sub-frame 161, one or more suspension arms 245, and a wheel interface 175. A wheel 172 is shown schematically in FIG. 6, mounted onto the wheel interface 175. The steering rod 260 is connected, and preferably pivotably, to the wheel interface 175 either directly or indirectly, and forward of the steering axis indicated by arrow 901. Thus, an outward (distal) movement of the steering rod 260 will 'push' the wheel to rotate about the steering axis 901 so a to steer to the vehicle's left. An inward (proximal) movement of the steering rod 260 will 'pull' the wheel to rotate about the steering axis 901) so as to steer to the vehicle's right. A vehicle 100 can include at least one pair of opposing wheel assemblies 150 according to my of the embodiments disclosed herein. As shown in FIG. 7A, a vehicle 100 can comprise a single pair of wheel assemblies $150_L$, $150_R$ according to any of the embodiments disclosed herein. The rear wheels in FIG. 7A (not shown) can use my conventional or prior art wheel arrangements. In other implementations, as shown in FIG. 7B, a vehicle 100 can comprise, exclusively, wheel assemblies 150 according to the embodiments disclosed herein, to the exclusion of conventional or prior art wheel arrangements. In both FIGS. 7A and 7B, an arrow 950 indicate a direction of vehicle motion so as to indicate which end is the front end of each vehicle.

The steering system 200 as described hereinabove, inter alia with respect to FIGS. 3, 4A-B and 5A-B, can be useful in stabilizing a vehicle by mitigating body roll when implemented in wheel assemblies 150 installed in a vehicle 100. In particular, the pivot member 210 can be beneficially arranged so as to transmit part or all of the forces acting on the wheels to the chassis of the vehicle (via the sub-frame 161 of the wheel assembly 150) in a vector that reduces, eliminates, and/or compensates for the body roll.

Figure 8A:
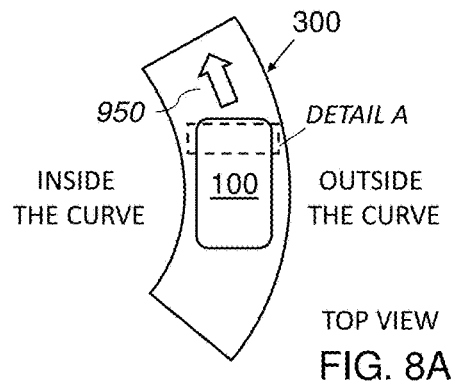
FIG. 8A is a top view of a vehicle on a curved section of roadway indicating respective directions.
Figure 8B:
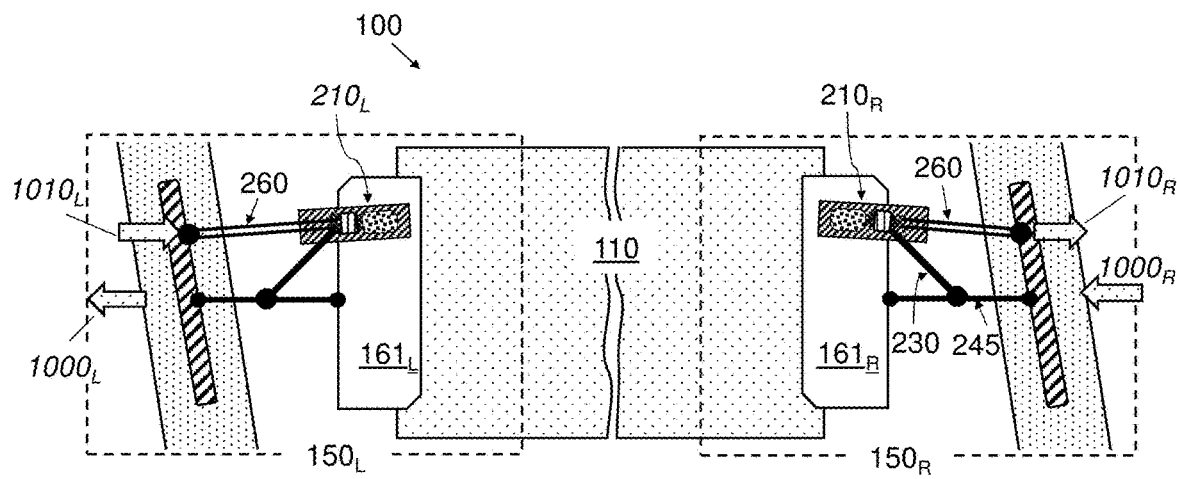
FIGS. 8B-C are respectively top detail and rear views of a portion of a vehicle comprising wheel assemblies receiving a lateral force according to embodiments of the present invention.
Figure 8C:
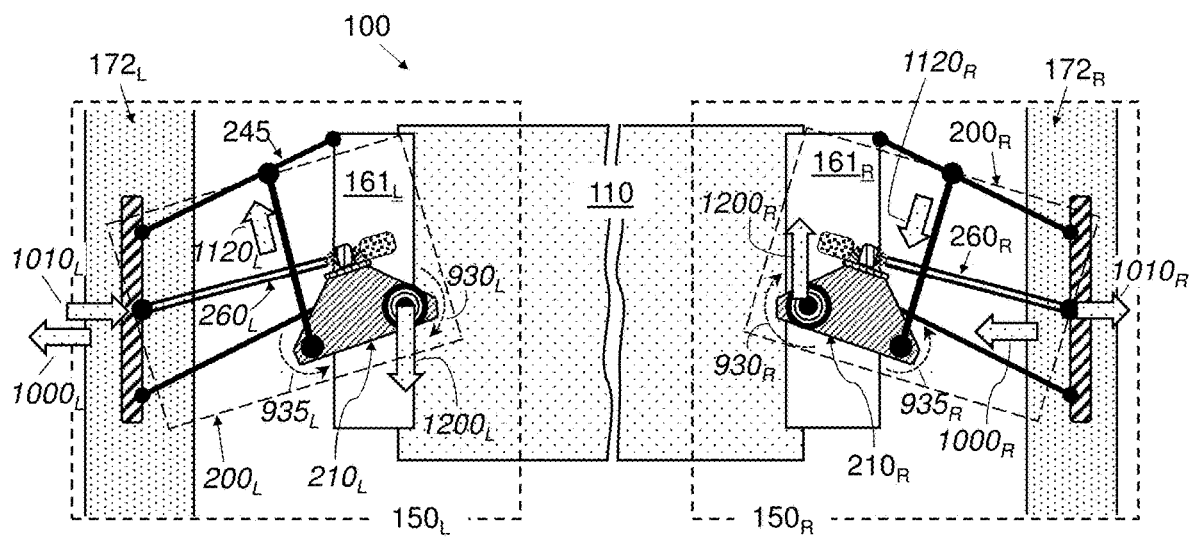

The following discussion of FIGS. 8A-C describes embodiments of a passive anti-roll system for a vehicle 100. The vehicle 100 can be, for example, an axle-less vehicle. The passive anti-roll system comprises, for each wheel 172 of a pair of opposing independently-suspended wheels 172, a pivot member 210 arranged to transfer a lateral force 1000 from a roadway surface 300 to multiple at-least-partly vertical force vectors 1120, 1200 that combine to mitigate body roll of the vehicle.

FIG. 8A is a top view of a vehicle 100 comprising at least one opposing pair of wheel assemblies 150 according to embodiments, moving on a curved roadway 300 in the direction indicated by the arrow 950. The respective sides of the roadway 300 are marked 'outside the curve' and 'inside the curve' so as to illustrate what these two expressions mean in this disclosure and in the appended claims. FIG. 8A illustrates a left-hand curve and, obviously, the relative locations of the inside and the outside of the curve are switched in the case of a right-hand curve.

FIGS. 8B-C schematically show, respectively, a top view (expanding the DETAIL A indicated in FIG. 8A), and a rear view of a portion of the vehicle 100 of FIG. 8A, together with indications of some of the forces acting upon components of the wheel assemblies 150. When the vehicle 100 is driving in a curve, a centripetal force (indicated by the arrows marked $1000_L$ and $1000_R$ in FIG. 8B and directed towards the inside of the curve) is provided by a frictional force exerted on the tires of the wheels of vehicle 100 by the roadway 300. The frictional force, as is known, keeps the vehicle from sliding towards the outside of the curve in the absence of roadway banking. At the same time, part of the load (weight) of the vehicle shifts to the wheels facing the outside of the curve, and with less load, the tires on the wheels facing the inside of the curve can experience reduced traction in their contact with the roadway. This phenomenon is called 'body roll' and can make travel less comfortable—or even less safe, because in an extreme condition the vehicle can slip or even roll over. According to embodiments, the components of the wheel assembly 150 are arranged to reduce body roll with reduced impact the on performance of the vehicle's suspension in everyday driving.

As the vehicle 100 moves through the curve, the positive caster/mechanical trail of the wheels, among other factors, acts to straighten the wheels, which have been turned towards the center of turn to follow the curve (shown as 'to the left' in the illustrated example). This creates a lateral reaction force and thereby a moment about the steering axis acting on each of the wheels 172, as indicated by the arrows 1010 in FIGS. 8A-B, opposite in direction to the centripetal force and transmitted by the wheels 172 to the respective steering rods 260. In the left-side wheel assembly $150_L$, the lateral force $1010_L$ acting on the wheel 172 is a 'inward-pushing' force, i.e., the force $1010_L$ causes the wheel to push the steering rod 260 inwards towards the center of the vehicle 100. In the right-side wheel assembly $150_R$, the lateral force $1010_R$ is a 'outward-pulling' force, i.e., the force $1010_R$ causes the wheel to pull the steering rod 260 outwards away from the center of the vehicle 100.

FIG. 8C illustrates forces in the steering system 200 in reaction to the lateral forces $1010_L$, $1010_R$ acting on the wheels. In the left-side wheel assembly $150_L$, the inwardly-directed lateral force $1010_L$ is transmitted by the steering rod 260 to the pivot member 210 (via the coupling arrangement of the actuator 251), causing the pivot member 210 to rotate in a clockwise direction around the pivot-connection element 165 of the sub-frame $161_L$ (the rotation being indicated by the arrow $930_L$). The rotation of the pivot member 210 is effective to cause the suspension-connector rod 230 to rotate counter-clockwise relative to the pivot member 210 (as indicated by arrow $935_L$) and transmit at least part of the force $1010_L$ to the suspension-connector rod 230, the transmitted force being indicated by arrow $1120_L$. It should be noted that the because of the pivoting action of the pivot member 210, the transmitted force vector $1120_L$ is at least partly vertical, meaning that the direction of the force vector $1120_L$ is at least 1° above horizontal, or at least 5° above horizontal, or at least 10° above horizontal, or at least 15° above horizontal, or at least 20° above horizontal, or at least 25° above horizontal, or at least 30° above horizontal, or at least 35° above horizontal, or at least 40° above horizontal. In some embodiments, the transmitted force vector $1120_L$ is more vertical than lateral, meaning that the direction of the force vector $1120_L$ is at least 46° above horizontal, or at least 50° above horizontal, or at least 55° above horizontal, or at least 60° above horizontal, or at least 65° above horizontal, or at least 70° above horizontal, or at least 75° above horizontal, or at least 80° above horizontal, or at least 85° above horizontal. The force vector $1120_L$ is transmitted by the suspension-connector rod 230 to the suspension arm 245 which is preferably configured to provide a resistive force (due to loads transferred by the wheel interface to the suspension system, gravity and the mass of the vehicle 100) to movement of the suspension-connector rod 230. The clockwise rotation of the pivot member 210 causes a substantially-vertical force vector indicated by arrow $1200_L$ to be transmitted to the sub-frame $161_L$ via the first pivot. Because of the presence of the resistive force of the suspension 245 opposing the movement of the suspension-connector rod 230, the magnitude of the substantially-vertical force vector $1200_L$ can be at least half, or at least 60%, or at least 70%, or at least 80%, or at least 90% of the magnitude of the lateral force $1010_L$. Of course, the substantially-vertical force vector $1200_L$ would qualify as an 'at-least-partly-vertical' force but would be referred to as such only when describing the two forces $1120_L$, $1200_L$ as multiple at-least-partly-vertical forces. The design of the steering system is such that the vertical component of the at-least-partly vertical force $1120_L$ has a direction opposite to that of the substantially-vertical force vector $1200_L$. 'Substantially-vertical' as used herein means within ±1° of being vertical, or within ±2°, or within ±3°, or within ±4°, or within ±5°, or within ±6°, or within ±7°, or within ±8°, or within ±9°, or within ±10°, or within ±11°, or within ±12°, or within ±13°, or within ±14°, or within ±15°. In embodiments, the sub-frame $161_L$ is fixedly mounted to the reference frame 110 of the vehicle 100, and the substantially-vertical force transferred to the sub-frame $161_L$ acts upon the reference frame 110 as well.

In the right-side wheel assembly $150_R$, the outwardly-directed lateral force $1010_R$ is transmitted by the steering rod 260 to the pivot member 210 (via the coupling arrangement of the actuator 251), causing the pivot member 210 to rotate in a clockwise direction around the pivot-connection element 165 of the sub-frame $161_R$ (the rotation being indicated by the arrow $930_R$). The rotation of the pivot member 210 is effective to cause the suspension-connector rod 230 to rotate counter-clockwise relative to the pivot member 210 (as indicated by arrow $935_R$) and transmit at least part of the force $1010_R$ to the suspension-connector rod 230, the transmitted force being indicated by arrow $1120_R$. It should be noted that the because of the pivoting action of the pivot member 210, the transmitted force vector $1120_R$ is at least partly vertical as the term is defined herein. In some embodiments, the transmitted force vector $1120_R$ is more vertical than lateral. The force vector $1120_R$ is transmitted by the suspension-connector rod 230 to the suspension arm 245 which, again, is effective to provide a resistive force (due in part to the mass of the vehicle 100) to movement of the suspension-connector rod 230. The clockwise rotation of the pivot member 210 causes a substantially-vertical force vector indicated by arrow $1200_R$ to be transmitted to the sub-frame $161_R$. Because of the presence of the resistive force of the suspension 245 opposing the movement of the suspension-connector rod 230, the magnitude of the substantially-vertical force vector $1200_R$ can be at least half, or at least 60%, or at least 70%, or at least 80%, or at least 90% of the magnitude of the lateral force $1010_R$. The design of the steering system is such that the vertical component of the at-least-partly vertical force $1120_R$ has a direction opposite to that of the substantially-vertical force vector $1200_R$. In embodiments, the sub-frame $161_R$ is fixedly mounted to the reference frame 110 of the vehicle 100, and the substantially-vertical force transferred to the sub-frame $161_R$ acts upon the reference frame 110 as well.

As per the foregoing discussion and in accordance with FIG. 8C, the substantially-vertical force vector $1200_L$ transferred to left-side sub-frame $161_L$ is a downward force vector, the left-side wheel assembly $150_L$ being on the side of the vehicle 100 facing the inside of the curve and experiencing an inwardly-directed lateral force $1010_L$. The substantially-vertical force vector $1200_R$ transferred to right-side sub-frame $161_R$ is a upward force vector, the left-side wheel assembly $150_R$ being on the side of the vehicle 100 facing the outside of the curve and experiencing an outwardly-directed lateral force $1010_L$. When taken together, the opposing force vectors $1200_L$ and $1200_R$, displaced from each other approximately by the width of the reference frame 110, are effective to provide a countering force, e.g., with a counter-clockwise moment of force, to the clockwise roll tendency of the vehicle 100 (all directions respective of the specific example and perspective of FIG. 8C).

In embodiments, a method of mitigating body roll in a vehicle 100 comprising two opposing axle-less, independently-suspended wheel assemblies 150 includes providing, for each of the wheel assemblies 150, a steering system 200 according to any of the embodiments disclosed herein. Preferably the steering system 200 includes a pivot member 200 having multiple pivot node locations and connected at a first pivot node location 212 to a sub-frame 161 of the respective wheel assembly 150, a steering rod 260 actuatable to rotate a wheel 172 about a steering axis 901, and mechanically coupled with the pivot member 210 to be co-pivotable therewith, and a suspension-connector rod 230 connected at a first end 231 thereof to the pivot member 210 at a second pivot-node location 214, and connected at a second end 232 thereof to a suspension arm 245 linking the wheel 172 of the vehicle 100 to the sub-frame 161. According to the method, a lateral force 1010 acting upon the wheel 172 is transmitted via the steering rod 260 to the pivot member 210 so as to rotate the pivot member 210, the rotation being effective to transmit a substantially-vertical force vector 1200 to the sub-frame 161.

For the sake of simplicity and clarity, the foregoing discussion has ignored the effects of wheel camber and toe (i.e., tracking). The skilled artisan will understand that camber, caster and toe angles can be selected to further mitigate the anti-roll function of the steering systems disclosed herein, and that in some designs the anti-roll function is impaired by such selection.

Self-steering, or 'bump steering' is an unwanted phenomenon of vehicles in which a sudden change in roadway height or terrain height, e.g., a bump or a dip (or pothole) causes the affected wheel to rapidly change its height relative to the chassis of the vehicle. A suspension system as a whole can be designed to mitigate the effect of the bump or dip on passenger comfort. However, the sudden change in the angle of the suspension arms tends to affect the steering of the vehicle: As the suspension arms rotate about their connection to the chassis, the steering tie-rod rotates as well. The length of the steering tie-rod is typically constant, so that a change in the distance between the connection of the rod with the wheel interface and the connection to the reference frame (or sub-frame) is restricted, and therefore the sudden movement (e.g., lateral movement of the steering tie-rod) causes the vehicle to 'self-steer'. In embodiments, the steering systems disclosed herein can be effective to reduce self-steering. As illustrated schematically in the non-limiting example of a wheel assembly 150 in FIG. 9A, a vertical force 1020 acting on a wheel 172 is transmitted by steering rod 260 to cause a 'counter-clockwise' rotation (indicated by arrow 930) in the pivot member 210. ('Counter-clockwise' should be understood only in accordance with the perspective of the specific drawing.) The rotation of the pivot member 210 allows that a fixed linear distance (indicated in FIG. 9A by line LD1) between the pivot-connection element 165 of sub-frame 161 and the distal end 262 of the steering rod 260 is maintained, or substantially maintained throughout so as to permit no more than a de minimis amount of bump steer. "Substantially maintained" means within ±1%, or ±2%, or ±31%, or ±4%, or ±5%, or ±6%, or ±7%, or ±8%, or ±9%, or ±10%, or ±11%, or ±12%, or ±13%, or ±14%, or ±15%. In an example, the de minimis amount of bump steer, is within ±2.0 degrees, or within ±1.6 degrees, or within ±1.2 degrees, or within ±0.8 degrees, or within ±0.6 degrees, or within ±0.4 degrees over the maximal vertical motion of the suspended wheel interface. At the same time, the pivoting of the steering assembly 250 as indicated by arrow 931 'absorbs' much of the inwardly-directed movement of the steering rod 260, i.e., at most a portion of the inwardly-directed movement of the steering rod 260 caused by the bump translates to a rotation of the wheel 172 and the remainder to pivoting of the pivot member; thus, the self-steering effect of the inwardly-directed force being transmitted by the steering rod 260 is reduced by the steering systems 200 disclosed herein.

In some implementations, the rotation can be encouraged by an upward force (indicated by arrow 1021) applied to the suspension-connector rod 230 by the suspension arm 245$_1$ when the wheel 172 is forced upwards by the uneven terrain.

While the preceding discussion of self-steering relates to an example in which the change in roadway or terrain height is 'upwards' (e.g., a bump) the invention applies equally to a 'downward' change in roadway or terrain height (e.g., a dip) and is similarly applied, mutatis mutandis. The example of FIG. 9B illustrates such a case of a 'downwards' change, where certain forces and movements are in respective directions opposite to those of the corresponding forces and movements of FIG. 9A. Examples of such forces and movements can include, and not exhaustively: the vertical 1020 force acting on the wheel 172; the pivoting direction 930 of the pivot member 210; the pivoting direction 931 of the steering assembly 250; and the force 1021 applied to the suspension-connector rod 230.

Figure 9A:
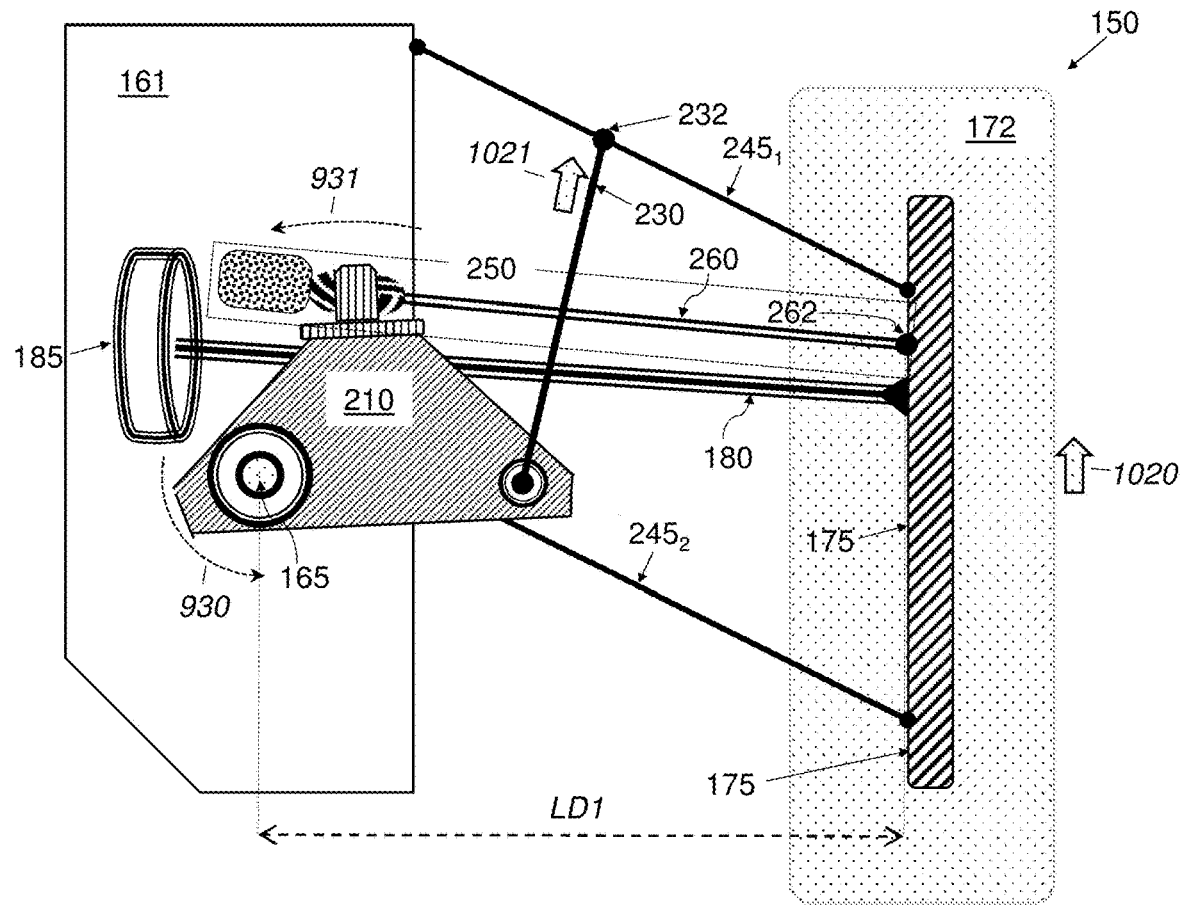
FIGS. 9A-B are schematic elevation-view drawings of a wheel assembly including a drivetrain and drivetrain motor, and including a wheel assembly receiving a vertical force, according to embodiments of the present invention.
Figure 9B:
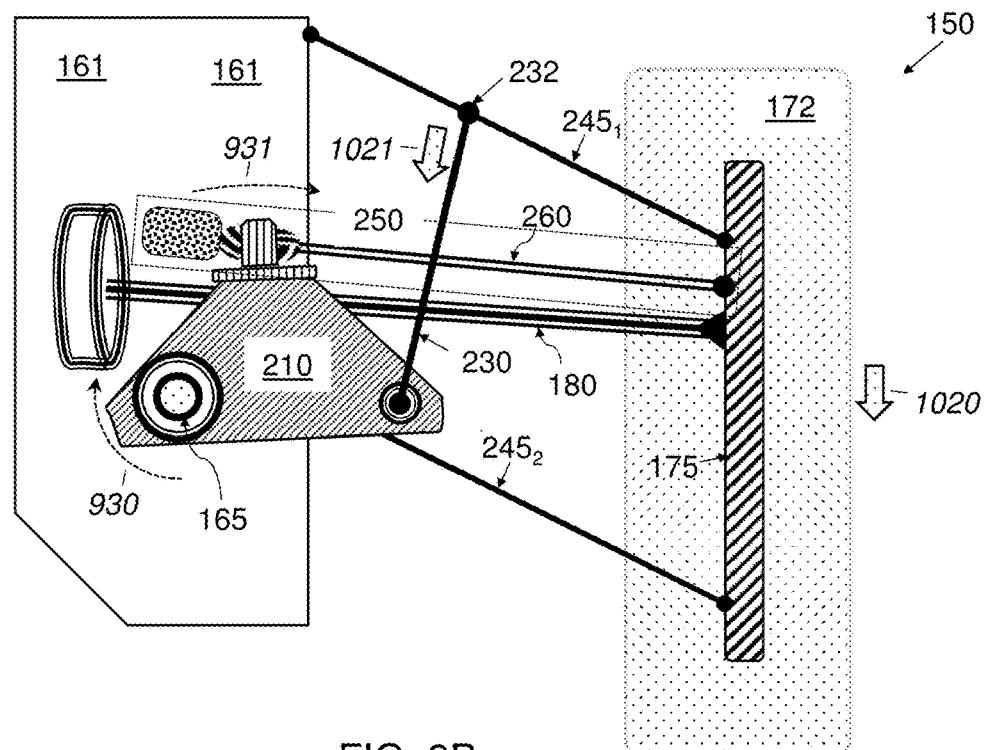

Still referring to FIGS. 9A-B, a wheel assembly 150 can include, in some embodiments, a drivetrain assembly 180 extending from a drivetrain motor 185 to the wheel interface 175. In some embodiments, the wheel assembly 150 can also include the drivetrain motor 185. In some embodiments, drivetrain motor 185 is coupled to sub-frame 161 and is thereby a sprung mass.

Figure 10:
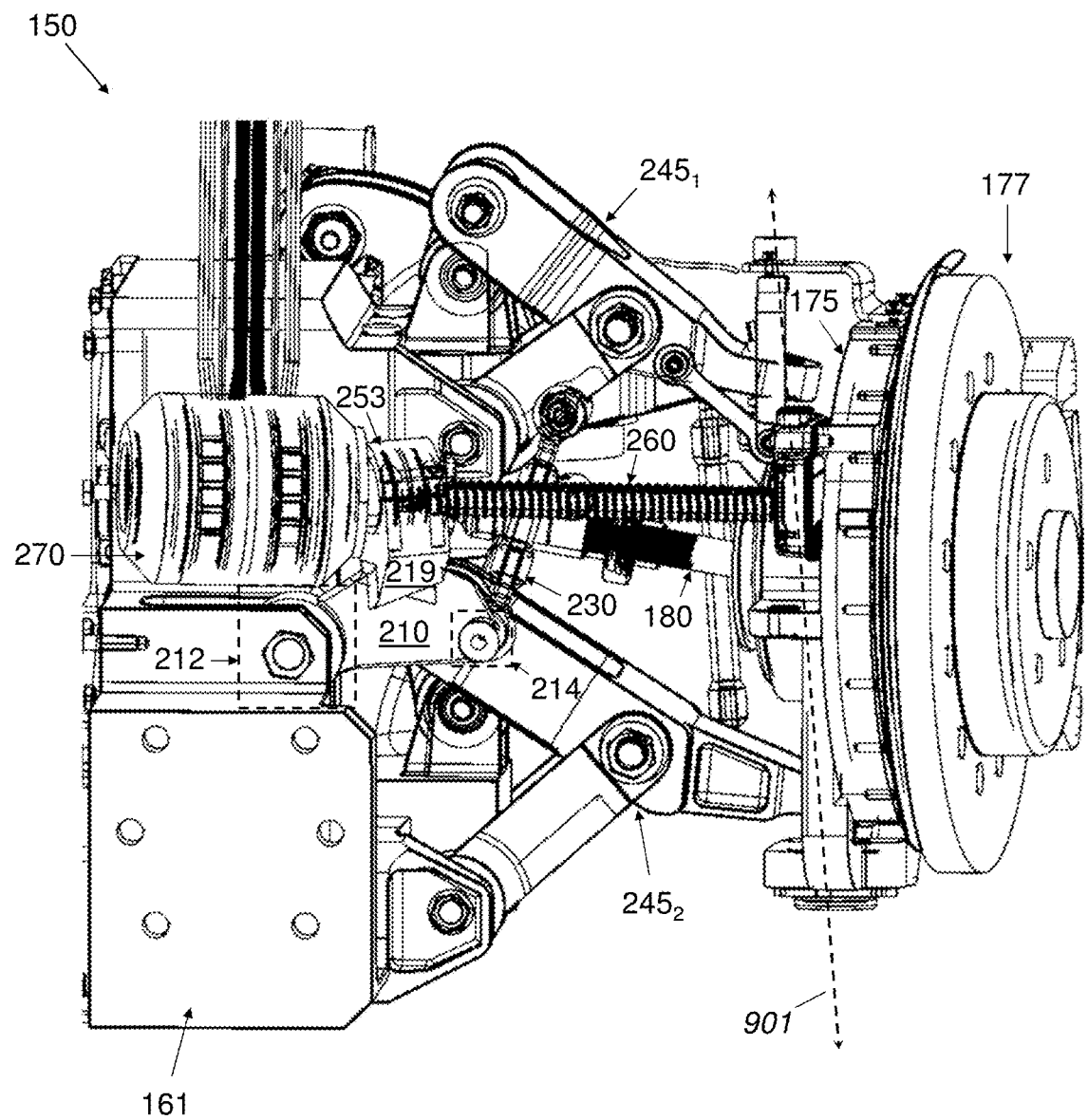
FIG. 10 is an elevation-view drawing of a wheel assembly including a drivetrain, according to embodiments of the present invention.

A non-limiting example of a wheel assembly 150 is shown in FIG. 10. In this example, upper and lower suspension arms 245$_1$, 245$_2$ comprise multiple arm segments. The suspension-connector rod 230 is connected at its proximal end to the pivot member 210 and at its distal end 232 to one such arm segment which links the upper control arm 245 to the subframe 161. The optional driveshaft 180 is shown, connecting to the wheel interface 175, as do the suspension arms 245 and the steering rod 260, where the steering axis (arrow 901) passes through the wheel interface 175, and the optional drivetrain motor (not shown) can be installed within the sub-frame 161 if desired. Any 'connections' mentioned in this disclosure can be direct connections and/or indirect connections. As shown in the figure, the wheel interface 175 is in contact with a brake assembly 177 and the wheel hub 174.

ADDITIONAL DISCUSSION

According to embodiments of the invention, a steering system for a wheel of a vehicle comprises: (a) a pivot member having multiple pivot-node locations, the pivot member connectable at a first pivot-node location to a sub-frame of the wheel; (b) a steering rod, actuatable to rotate the wheel about a steering axis, the steering rod mechanically coupled with the pivot member to be co-pivotable therewith; and (c) a suspension-connector rod connected at a first end thereof to the pivot member at a second pivot-node location, the suspension-connector rod connectable at a second end thereof to a suspension arm linking the wheel of the vehicle to the sub-frame, wherein a lateral force acting upon the wheel is transmitted via the steering rod to the pivot member so as to rotate the pivot member, the rotation being effective to transmit a substantially-vertical force vector to the sub-frame.

In some embodiments, it can be that the lateral force is an inwardly-directed load on the steering rod, and/or that the substantially-vertical force vector is a downward force vector. In some embodiments, it can be that the lateral force is an outwardly-directed load on the steering rod, and/or that the substantially-vertical force vector is an upward force vector.

In some embodiments, it can be that when (i) the steering system is installed in the vehicle, (ii) the vehicle is in motion in a curve and/or (iii) the wheel is a wheel facing inside the curve, the substantially-vertical force vector is a downward force vector. In some embodiments, it can be that when (i) the steering system is installed in the vehicle, (ii) the vehicle is in motion in a curve and/or (iii) the wheel is a wheel facing outside the curve, the substantially-vertical force vector is an upward force vector.

In some embodiments, the rotation can additionally be effective to transmit an at-least-partly vertical force vector to the suspension-connector rod, a vertical component of the at-least-partly vertical force vector being in a direction opposite to that of a vertical component of the substantially-vertical force vector. In some such embodiments, the at least-partly-vertical force vector and the substantially-vertical force vector can combine to mitigate body roll of the vehicle.

In some embodiments, the steering system as disclosed in any of the embodiments herein can comprise an actuator connected to the steering rod and configured to cause the steering rod to move inwardly and outwardly, and/or an actuator-coupling connecting the actuator and the pivot member. In some such embodiments, the actuator-coupling can include a bearing arrangement to allow the steering assembly to swivel relative to the pivot member such that a distal end of the steering rod can move to describe a generalized cone.

In some embodiments, the wheel of the vehicle can be one of two opposing, independently-suspended wheels.

In some embodiments, it can be that when the vehicle is in motion and the wheel traverses a portion of a terrain characterized by a local change in terrain height, the pivot member is rotated by a force transmitted by the steering rod so as to reduce self-steering caused by the change in height.

According to embodiments of the invention, a wheel assembly comprises: (a) a sub-frame configured to be mounted to a reference frame of a vehicle; (b) a wheel interface; and (c) a steering system according to any one or more of the embodiments disclosed hereinabove. In some embodiments, the wheel assembly can additionally comprise a drivetrain assembly comprising a rotatable drivetrain shaft connected to the wheel interface, the drivetrain shaft extending from a drivetrain motor towards the wheel interface. In some such embodiments, the wheel assembly can additionally comprise the drivetrain motor.

According to embodiments of the invention, a vehicle comprises: a pair of opposing wheel assemblies according to any one ore more of the embodiments disclosed hereinabove, a corresponding pair of opposing wheels, and the reference frame. In some such embodiments, it can be that when the vehicle is in motion in a curve, the respective substantially-vertical force vectors transmitted to the respective sub-frames are in opposing directions.

According to embodiments of the invention, a steering system of a wheel of a vehicle comprises: (a) a pivot member having multiple pivot-node locations, and configured to be pivotably connected at a first pivot-node location to a reference frame of the vehicle; (b) a steering assembly comprising (i) a steering rod, actuatable to rotate the wheel about a steering axis, (ii) an actuator for causing the steering rod to move inwardly and outwardly, the actuator mechanically coupled to the pivot member such that the steering assembly is co-pivotable with the pivot member, and (iii) a powered steering motor for transmitting rotation energy to the actuator; and (c) a suspension-connector rod pivotably connected at a first end thereof to the pivot member at a second pivot-node location, and configured to be pivotably connected at a second end thereof to a suspension-arm linking the wheel of the vehicle to the reference frame, wherein the mechanical coupling includes a bearing arrangement to allow the steering assembly to swivel relative to the pivot member such that a distal end of the steering rod can move to describe a generalized cone.

In some embodiments, it can be that when the steering system is installed in the vehicle, a lateral force acting upon the wheel is transmitted via the steering rod to the pivot member so as to rotate the pivot member, the rotation being effective to transmit an at-least-partly vertical force to the suspension-connector rod and a substantially-vertical force vector to the reference frame, the at least-partly-vertical force vector and the substantially-vertical force vector combining to mitigate body roll of the vehicle.

According to embodiments of the invention, a passive anti-roll system for an axle-less vehicle comprises, for each wheel of a pair of opposing independently-suspended wheels, a pivot member arranged to transfer a lateral force from a roadway surface to multiple at-least-partly vertical force vectors that combine to mitigate body roll of the vehicle.

According to embodiments of the invention, a wheel assembly for an independently-suspended wheel (and/or for an axle-less, independently-suspended wheel), comprises: (a) a sub-frame configured to be mounted to a reference frame of a vehicle; (b) a wheel interface; and (c) a steering system comprising: (i) a pivot member having multiple pivot-node locations and connected at a first pivot-node location to the sub-frame; (ii) a suspension-connector rod connected at a first end thereof to the pivot member at a second pivot-node location, and at a second end thereof to a suspension arm linking the wheel interface to the sub-frame, (iii) a steering assembly comprising (1) a steering rod connected distally to the wheel interface and proximally actuatable to rotate the wheel about a steering axis, and (2) an actuator for causing the steering rod to move inwardly and outwardly, the actuator mechanically coupled to the pivot member such that the steering assembly is co-pivotable with the pivot member about the first and second pivot-node locations, wherein the pivot member is arranged to transfer a lateral force from a roadway surface to multiple at-least-partly vertical force vectors that combine to mitigate body roll of the vehicle.

In some embodiments, the mechanical coupling of the actuator can include a bearing arrangement to allow the steering assembly to swivel relative to the pivot member such that a distal end of the steering rod can move to describe a generalized cone.

In some embodiments, the wheel assembly can additionally comprise a drivetrain assembly comprising a rotatable drivetrain shaft connected to the wheel interface, extending from a drivetrain motor towards the wheel interface.

According to embodiments of the invention, a vehicle comprises a reference frame and two opposing wheel assemblies, each one of the two wheel assemblies comprising a sub-frame mounted to the reference frame, a wheel supported by a wheel interface, and a steering system, the steering system comprising: (a) a pivot member having multiple pivot-node locations and connected at a first pivot-node location to the sub-frame; (b) a suspension-connector rod connected at a first end thereof to the pivot member at a second pivot-node location, and at a second end thereof to a suspension arm linking the wheel interface to the sub-frame, and (c) a steering assembly comprising (i) a steering rod connected distally to the wheel interface and proximally actuatable to rotate the wheel about a steering axis, and (ii) an actuator for moving inwardly and outwardly the steering rod, the actuator mechanically coupled to the pivot member such that the steering assembly is co-pivotable with the pivot member about the first and second pivot-node locations.

In some embodiments, the mechanical coupling of the actuator can include a bearing arrangement to allow the steering assembly to swivel relative to the pivot member such that a distal end of the steering rod can move to describe a generalized cone.

In some embodiments, the wheel assembly can additionally comprise a drivetrain assembly comprising a drivetrain motor mounted to the sub-frame, and/or a rotatable drivetrain shaft extending from the drivetrain motor towards the wheel interface to connect thereto.

In some embodiments, it can be that for each one of the two wheel assemblies, a lateral force acting upon the wheel is transmitted via the steering rod to the pivot member so as to rotate the pivot member, the rotation being effective to transmit a substantially-vertical force vector to the reference frame. In some such embodiments, it can be that for the two opposing wheel assemblies, the respective substantially-vertical force vectors transmitted to the reference frame are in opposing directions. In some embodiments, it can be that the rotation is additionally effective to transmit an at-least-partly vertical force vector to the respective suspension-connector rod, a vertical component of the respective at-least-partly vertical force vector being in a direction opposite to that of a vertical component of the respective substantially-vertical force vector. In some embodiments, the respective at least-partly-vertical force vectors and the respective substantially-vertical force vectors can combine to mitigate body roll of the vehicle.

In some embodiments, it can be that for any one of the two wheel assemblies, when the vehicle is in motion and a wheel traverses a portion of terrain characterized by a local change in terrain height, the pivot member is rotated by a force transmitted by the steering rod so as to reduce self-steering caused by the change in height.

In some embodiments, the vehicle can additionally comprise third and fourth opposing axle-less, independently-suspended wheel assemblies.

A method is disclosed, according to embodiments of the invention, of mitigating body roll in a vehicle. According to the method, the vehicle comprises two opposing independently-suspended wheel assemblies and/or two opposing axle-less independently-suspended wheel assemblies. The method comprises: providing, for each one of the two wheel assemblies, a steering system comprising (i) a pivot member having multiple pivot node locations and connected at a first pivot node location to a sub-frame of a respective wheel, (ii) a steering rod, actuatable to rotate the wheel about a steering axis, and mechanically coupled with the pivot member to be co-pivotable therewith, and (iii) a suspension-connector rod connected at a first end thereof to the pivot member at a second pivot-node location, and connected at a second end thereof to a suspension arm linking the wheel of the vehicle to the sub-frame, wherein a lateral force acting upon the wheel is transmitted via the steering rod to the pivot member so as to rotate the pivot member, the rotation being effective to transmit a substantially-vertical force vector to the sub-frame.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise.

The invention claimed is:

1. A steering system for a wheel of a vehicle, the steering system comprising:
   a. a pivot member having multiple pivot-node locations, the pivot member connectable at a first pivot-node location to a sub-frame of the wheel;
   b. a steering rod, actuatable to rotate the wheel about a steering axis, the steering rod mechanically coupled with the pivot member to be co-pivotable therewith; and
   c. a suspension-connector rod connected at a first end thereof to the pivot member at a second pivot-node location, the suspension-connector rod connectable at a second end thereof to a suspension arm linking the wheel of the vehicle to the sub-frame,
   wherein a lateral force acting upon the wheel is transmitted via the steering rod to the pivot member so as to rotate the pivot member, the rotation being effective to transmit a substantially-vertical force vector to the sub-frame,
   wherein at least one condition selected from the group consisting of a first condition, a second condition, a third condition, a fourth condition, a fifth condition, and a sixth condition is true, and wherein:

I. according to the first condition, the lateral force is an inwardly-directed loan on the steering rod, and the substantially-vertical force vector is a downward force vector;
   II. according to the second condition, the lateral force is an outwardly-directed load on the steering rod, and the substantially-vertical force vector is an upward force vector;
   III. according to the third condition, when:
      (A) the steering system is installed in the vehicle,
      (B) the vehicle is in motion in a curve and
      (C) the wheel is a wheel facing inside the curve,
      the substantially-vertical force vector is a downward force vector;
   IV. according to the fourth condition, when:
      (A) the steering system is installed in the vehicle,
      (B) the vehicle is in motion in a curve and
      (C) the wheel is a wheel facing outside the curve,
      the substantially-vertical force vector is an upward force vector;
   V. according to the fifth condition, the rotation is additionally effective to transmit an at-least-partly vertical force vector to the suspension-connector rod, a vertical component of the at-least-partly vertical force vector being in a direction opposite to that of a vertical component of the substantially-vertical force vector; and
   VI. according to the sixth condition, the steering system comprises an actuator connected to the steering rod and configured to cause the steering rod to move inwardly and outwardly, and an actuator-coupling connecting the actuator and the pivot member.

2. The steering system of claim 1, wherein at least the first condition is true.

3. The steering system of claim 1, wherein at least the second condition is true.

4. The steering system of claim 1, wherein at least the third condition is true.

5. The steering system of claim 1, wherein at least the fourth condition is true.

6. The steering system of claim 1, wherein at least the fifth condition is true.

7. The searing system of claim 6, wherein the at least-partly-vertical force vector and the substantially-vertical force vector combine to mitigate body roll of the vehicle.

8. The steering system of claim 1, wherein at least the sixth condition is true.

9. The steering system of claim 8, wherein the actuator-coupling includes a bearing arrangement to allow the steering system to swivel relative to the pivot member such that a distal end of the steering rod can move to describe a generalized cone.

10. The steering system of claim 1, wherein the wheel of the vehicle is one of two opposing, independently-suspended wheels.

11. The system of claim 1 wherein at least the first and fifth conditions are true.

12. A wheel assembly for an axle-less, independently-suspended wheel, the wheel assembly comprising:
   a. a sub-frame configured to be mounted to a reference frame of a vehicle;
   b. a wheel interface; and
   c. a steering system comprising:
      i. a pivot member having multiple pivot-node locations and connected at a first pivot-node location to the sub-frame;

ii. a suspension-connector rod connected at a first and thereof to the pivot member at a second pivot-node location, and at a second end thereof to a suspension arm linking the wheel interface to the sub-frame, and iii. a steering assembly comprising (1) a steering rod connected distally to the wheel interface and proximally actuatable to rotate the wheel about a steering axis, and (2) a actuator for causing the steering rod to move inwardly and outwardly, the actuator mechanically coupled to the pivot member such that the steering assembly is co-pivotable with the pivot member about the first and second pivot-node locations, wherein the pivot member is arranged to transfer a lateral force from a roadway surface to multiple at-least-partly vertical force vectors that combine to mitigate body roll of the vehicle.

13. The wheel assembly of claim 12, wherein the mechanical coupling of the actuator includes a bearing arrangement to allow the steering assembly to swivel relative to the pivot member such that a distal and of the steering rod can move to describe a generalized cone.

14. The wheel assembly of claim 12, additionally comprising a drivetrain assembly comprising a drivetrain motor mounted to the sub-frame, and a rotatable drivetrain shaft extending from the drivetrain motor towards the wheel interface to connect thereto.

15. A vehicle comprising: a pair of opposing wheel assemblies according to claim 12, a corresponding pair of opposing wheels, and the reference frame.

16. The vehicle of claim 15, wherein for each one of the two wheel assemblies, a lateral force acting upon the wheel is transmitted via the steering rod to the pivot member so as to rotate the pivot member, the rotation being effective to transmit a substantially-vertical force vector to the reference frame.

17. The vehicle of claim 16, wherein, for the two opposing wheel assemblies, the respective substantially-vertical force vectors transmitted to the reference frame are in opposing directions.

18. The vehicle of claim 16, wherein the rotation is additionally effective to transmit an at-least-partly vertical force vector to the respective suspension-connector rod, a vertical component of the respective at-least-partly vertical force vector being in a direction opposite to that of a vertical component of the respective substantially-vertical force vector.

19. The vehicle of claim 18, wherein the respective at least-partly-vertical force vectors and the respective substantially-vertical force vectors combine to mitigate body roll of the vehicle.

20. An axle-less vehicle comprising a passive anti-roll system, the passive anti-roll system comprising, for each wheel of a pair of opposing independently-suspended wheels:

a pivot member arranged to transfer a lateral force from a roadway surface to multiple at-least-partly vertical force vectors that combine to mitigate body roll of the vehicle, and a steering assembly comprising (i) a steering rod connected distally to a wheel interface and proximally actuatable to rotate the wheel about a steering axis, and (ii) and actuator for causing the steering rod to move inwardly and outwardly, the actuator mechanically coupled to the pivot member such that the steering assembly is co-pivotable with the pivot member about first and second pivot-node locations of the pivot member.

* * * * *